(12) United States Patent
Al-Somani

(10) Patent No.: US 8,861,721 B2
(45) Date of Patent: *Oct. 14, 2014

(54) SYSTEM AND METHOD FOR SECURING SCALAR MULTIPLICATION AGAINST SIMPLE POWER ATTACKS

(71) Applicant: Umm Al-Qura University, Makkah (SA)

(72) Inventor: Turki Faisal Al-Somani, Makkah (SA)

(73) Assignee: Umm Al-Qura University, Makkah (SA)

( * ) Notice: Subject to any disclaimer, the term of this patent is extended or adjusted under 35 U.S.C. 154(b) by 29 days.

This patent is subject to a terminal disclaimer.

(21) Appl. No.: 13/727,568

(22) Filed: Dec. 26, 2012

(65) Prior Publication Data
US 2014/0177827 A1 Jun. 26, 2014

(51) Int. Cl.
*H04L 9/08* (2006.01)
*H04L 9/30* (2006.01)

(52) U.S. Cl.
CPC ..................... *H04L 9/30* (2013.01)
USPC ............. 380/30; 380/28; 380/44; 380/45; 380/46; 380/47; 380/277

(58) Field of Classification Search
USPC ................. 380/28, 30, 44–48, 277
See application file for complete search history.

(56) References Cited

U.S. PATENT DOCUMENTS

| 6,826,586 | B2 | | 11/2004 | Chang |
|---|---|---|---|---|
| 7,853,012 | B2 | * | 12/2010 | Sarangarajan et al. ......... 380/28 |
| 7,853,013 | B2 | * | 12/2010 | Vasyltsov et al. ............... 380/28 |
| 7,983,415 | B2 | * | 7/2011 | Al-Gahtani et al. ........... 380/30 |
| 8,045,705 | B2 | * | 10/2011 | Antipa et al. ................... 380/28 |
| 8,369,517 | B2 | * | 2/2013 | Venelli et al. ................... 380/30 |
| 2004/0247114 | A1 | * | 12/2004 | Joye ................................ 380/28 |
| 2007/0098154 | A1 | * | 5/2007 | Antipa et al. ................... 380/30 |
| 2008/0019509 | A1 | * | 1/2008 | Al-Gahtani et al. ........... 380/30 |
| 2008/0144812 | A1 | * | 6/2008 | Al-Gahtani et al. ........... 380/30 |
| 2008/0273657 | A1 | * | 11/2008 | Klausz et al. ................... 378/21 |
| 2008/0273695 | A1 | * | 11/2008 | Al-Gahtani et al. ........... 380/30 |
| 2008/0301459 | A1 | * | 12/2008 | Ebeid ............................ 713/180 |
| 2009/0046851 | A1 | * | 2/2009 | Elmegaard-Fessel .......... 380/28 |
| 2009/0052657 | A1 | * | 2/2009 | Golic ............................... 380/28 |
| 2009/0074178 | A1 | * | 3/2009 | Longa et al. .................... 380/28 |
| 2009/0180610 | A1 | * | 7/2009 | Tobergte ......................... 380/28 |
| 2009/0207997 | A1 | * | 8/2009 | Izu et al. ......................... 380/28 |
| 2009/0214023 | A1 | | 8/2009 | Al-Somani et al. |
| 2009/0214025 | A1 | | 8/2009 | Golic |

FOREIGN PATENT DOCUMENTS

| CN | 1806224 A | 7/2006 |
|---|---|---|
| CN | 101366232 A | 2/2009 |
| KR | 20070001376 A | 1/2007 |

* cited by examiner

*Primary Examiner* — Kambiz Zand
*Assistant Examiner* — Tongoc Tran
(74) *Attorney, Agent, or Firm* — Richard C. Litman

(57) ABSTRACT

The system and method for securing scalar multiplication against simple power attacks (SPAs) delays required point additions in elliptic curve cryptosystem scalar multiplication. A buffer is used to store the points that will be added later until the buffer is full or the last bit of a multiplier k is inspected. Then, the stored points in the buffer are added to the accumulation point. The same procedure is repeated whenever the buffer is full again. This makes the power trace appears as a repeated sequence of consecutive point doubling followed by consecutive point additions. This makes it very difficult for an attacker to know the exact value of the inspected bit during the scalar multiplication process.

2 Claims, 1 Drawing Sheet

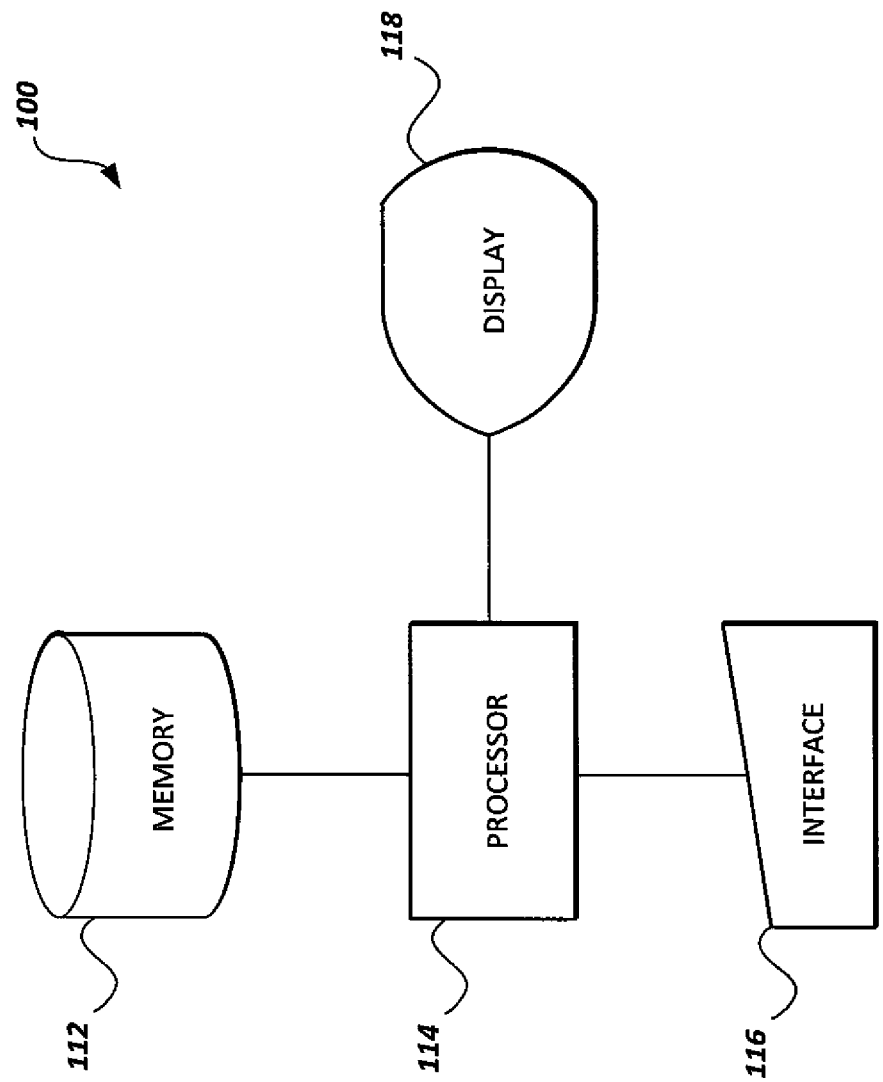

SYSTEM AND METHOD FOR SECURING SCALAR MULTIPLICATION AGAINST SIMPLE POWER ATTACKS

BACKGROUND OF THE INVENTION

1. Field of the Invention

The present invention relates to cryptography systems and methods, and particularly to a system and method for securing scalar multiplication against simple power attacks.

2. Description of the Related Art

Elliptic Curve Cryptosystems (ECC), originally proposed by Niel Koblitz and Victor Miller in 1985, offer a serious alternative to earlier public key cryptosystems, such as Rivest-Shamir-Adleman (RSA) and ElGamal, with much shorter key size. To date, no significant breakthroughs have been made in determining weaknesses in the ECC algorithm, which is based on the discrete logarithm problem over points on an elliptic curve. The fact that the problem appears so difficult to crack means that key sizes can be reduced considerably, even exponentially. This has caused ECC to become a serious challenger to RSA and ElGamal cryptosystems. Because of these advantages, ECC have been recently incorporated in many standards. ECC have gained popularity for cryptographic applications because of the short key, and are considered to be particularly suitable for implementation on smart cards or mobile devices.

An elliptic curve over a finite field GF(q) defines a set of points (x, y) that satisfy the elliptic curve equation together with the point O, known as the "point at infinity". The "point at infinity" does not satisfy the elliptic curve equation. The coordinates x and y of the elliptic curve points are elements of the field GF(q), where $q=p^m$ and p is prime.

Equations (1) and (2) define the elliptic curve equations for the fields GF(p) and GF($2^m$), respectively:

$$y^2 = x^3 + ax + b \quad (1)$$

where $a, b \in GF(p)$ and $4a + 27b^2 \neq 0 \pmod{p}$; and $$y^2 + xy = x^3 + ax^2 + b \quad (2)$$

where $a, b \in GF(2^m)$ and $b \neq 0$.

The set of discrete points on an elliptic curve form an abelian group (commutative group), whose group operation is known as point addition. Bounds for the number of discrete points n on an elliptic curve over a finite field GF(q) are defined by Hasse's theorem, given in Equation (3), where the symbol n represents the number of points on the elliptic curve and where $q=p^m$ represents the number of elements in the underlying finite field:

$$q + 1 - 2\sqrt{q} \leq n \leq 1 + 1 + 2\sqrt{q}. \quad (3)$$

Elliptic curve "point addition" is defined according to the "chord-tangent process". Point addition over GF(p) is described as follows: Let P and Q be two distinct points on an elliptic curve E defined over the real numbers with $Q \neq -P$ (Q is not the additive inverse of P). The addition of P and Q is the point R=P+Q, where R is the additive inverse of S, and S is a third point on the elliptic curve intercepted by the straight line through points P and Q. For the curve under consideration, R is the reflection of the point S with respect to the x-axis, that is, if R is the point (x, y), then S is the point (x, −y).

When P=Q and $P \neq -P$, the addition of P and Q is the point R, where R=2P and R is the additive inverse of S, and S is the third point on the elliptic curve intercepted by the straight line tangent to the curve at point P. This operation is referred to as "point doubling".

The "point at infinity", O, is the additive identity of the group. The most relevant operations involving O are the following: the addition of a point P and O is equal to P (i.e., P+O=P); and the addition of a point P and its additive inverse, −P, is equal to O (i.e., P−P=O). If P is a point on the curve, then −P is also a point on the curve.

The point operation used by elliptic curve cryptosystems is referred to as point multiplication. This operation is also referred to as scalar point multiplication. The point multiplication operation is denoted as kP, where k is an integer number and P is point on the elliptic curve. The operation kP represents the addition of k copies of point P, as shown in Equation (4) below:

$$kP = \underbrace{P + P + \ldots + P}_{k \text{ times } P}. \quad (4)$$

Elliptic curve cryptosystems are built over cyclic groups. Each group contains a finite number of points, n, that can be represented as scalar multiples of a generator point: iP for i=0, 1, ..., n−1, where P is a generator of the group. The order of point P is n, which implies that nP=O and iP$\neq$O for $1 \leq i \leq n-1$. The order of each point on the group must divide n. Consequently, a point multiplication kQ for k>n can be computed as (k mod n)Q.

Scalar multiplication is the basic operation for ECC. Scalar multiplication in the group of points of an elliptic curve is the analogue of exponentiation in the multiplicative group of integers modulo a fixed integer m. Computing kP can be performed using a straightforward double-and-add approach based on the binary representation of $k = k_{l-1}, \ldots, k_0$ where $k_{l-1}$ is the most significant bit of k. Other scalar multiplication methods have been proposed in the literature.

One of the simplest scalar multiplication algorithms is the double-and-add point multiplication algorithm, which is the so-called binary algorithm. Algorithm 1 and 2 show two such double-and-add scalar multiplication algorithms, respectively. The algorithms inspect the multiplier k. For each inspected bit, the algorithms perform a point double, and if the inspected bit is one, the algorithms also perform a point add:

---
Algorithm 1: Double-and-Add
---
Inputs: P,k
Output: kP
Initialization:
    Q[0] = 0; Q[1] = P
Scalar Multiplication:
    for i = 0 to m−1
        if $k_i$ = 1 then Q[0] = ADD(Q[0],Q[1])
        Q[1] = DBL(Q[1])
    end for
return Q[0]

---
Algorithm 2: Double-and-Add-Always
---
Inputs: P,k
Output: kP
Initialization:
    Q[0] = P; Q[1] = 0; Q[2] = P
Scalar Multiplication:
    for i = 0 to m−1
        Q[1] = Q[1+$k_i$]
        Q[0] = DBL(Q[0])

Algorithm 2: Double-and-Add-Always

```
        Q[2] = ADD(Q[0],Q[1])
    end for
return Q[1]
```

In the above algorithms, the "DBL" operation is a simple point doubling operation; e.g., Q[1]=DBL(Q[1]) simply means updating Q[1] as Q[1]=2Q[1]. Similarly, the "ADD" operation is a simple point adding operation; e.g., Q[0]=ADD (Q[0],Q[1]) simply means updating Q[0] as Q[0]=Q[0]+Q [1]. As noted above, kP can be computed using a straightforward binary method based on the binary expression of multiplier k. A conventional prior art scalar multiplication method for elliptic cryptosystems is shown in the U.S. Patent Application Publication No. 2009/0214023, which is hereby incorporated by reference in its entirety.

The binary scalar multiplication method shown in Algorithm 1 is the most straightforward scalar multiplication method. It inspects the bits of the scalar multiplier k, and if the inspected bit $k_i$=0, only point doubling is performed. If, however, the inspected bit $k_i$=1, both point doubling and point addition are performed. The binary method requires m point doublings and an average of m/2 point additions.

Power analysis attacks are usually divided into two types: Simple Power Analysis (SPA) attacks and Differential Power Analysis (DPA) attacks. SPA attacks consist of observing the power consumption during a single execution of a cryptographic algorithm. The power consumption analysis may also enable one to distinguish between point addition and point doubling. In the "double-and-add-always" algorithm, shown in Algorithm 2, the point addition and point doubling are performed in each loop iteration, where the result of the point addition operation may be either accepted or ignored based on the $k_i$ value.

The disadvantage of the double-and-add-always algorithm is the added dummy point additions. Algorithm 2 requires m−1 point doublings and m−1 point additions. It would be desirable to provide an effective countermeasure against SPA attacks in elliptic curve cryptosystems which requires no such additional computational overhead.

Thus, a system and method for securing scalar multiplication against simple power attacks solving the aforementioned problems is desired.

SUMMARY OF THE INVENTION

The system and method for securing scalar multiplication against simple power attacks (SPAs) delays required point additions in elliptic curve cryptosystem scalar multiplication. Scalar multiplication is the basic operation for elliptic curve cryptosystems (ECCs). Scalar multiplication of a group of points on an elliptic curve is analogous to the exponentiation of a multiplicative group of integers modulo a fixed integer m. The scalar multiplication operation, denoted as kP, where k is an integer and P is a point on the elliptic curve, represents the addition of k copies of point P. Scalar multiplication is then computed by a series of point doubling and point addition operations of the point P that depends on the bit sequence that represents the scalar multiplier k.

In the present method, a buffer is used to store the points that will be added later until the buffer is full or the last bit of the multiplier k is inspected. Then, the stored points in the buffer are added to the accumulation point. The same procedure is repeated whenever the buffer is full again. This makes the power trace appear as a repeated sequence of consecutive point doubling, followed by consecutive point additions. This makes it very difficult for an attacker to know the exact value of the inspected bit during the scalar multiplication process. The pseudo-code of the method for securing scalar multiplication against simple power attacks is as follows:

```
Inputs: P,k
Output: kP
Initialization:
    Q[0] = 0; Q[1] = P
Scalar Multiplication:
    for i = 0 to m−1
        if k_i = 1 then
            save Q[1] in the buffer
            if the buffer is full or i = m−1 then
                while the buffer is not empty do
                    Q[0] = ADD(Q[0], a point from the buffer)
                    update the buffer by removing the point that
                        has been added in the previous step
                end while
            end if
        end if
        Q[1] = DBL(Q[1])
    end for
return Q[0]
```

The above is a method for securing elliptic curve scalar multiplication of a private key k with a point P against simple power attacks using a cryptographic device. A physical, non-transitory buffer memory is first established, followed by the precomputation of a plurality of points Q[i] on an elliptic curve, where i is an integer. Then, the private key k is partitioned into m bits, where m is an integer, such that k=($k_{m-1}$, . . . , $k_0$). The method is of general application, and may be used wherever it is necessary to perform scalar multiplication, including public-key exchange, digital signatures, message encryption and decryption, etc.

These and other features of the present invention will become readily apparent upon further review of the following specification and drawings.

BRIEF DESCRIPTION OF THE DRAWINGS

The sole drawing FIGURE is a block diagram illustrating system components of a system for implementing the method for securing scalar multiplication against simple power attacks.

Similar reference characters denote corresponding features consistently throughout the attached drawings.

DETAILED DESCRIPTION OF THE PREFERRED EMBODIMENTS

The system and method for securing scalar multiplication against simple power attacks (SPAs) delays required point additions in elliptic curve cryptosystem scalar multiplication. Scalar multiplication is the basic operation for elliptic curve cryptosystems (ECCs). Scalar multiplication of a group of points on an elliptic curve is analogous to the exponentiation of a multiplicative group of integers modulo a fixed integer m. The scalar multiplication operation, denoted as kP, where k is an integer and P is a point on the elliptic curve, represents the addition of k copies of point P. Scalar multiplication is then computed by a series of point doubling and point addition operations of the point P that depends on the bit sequence that represents the scalar multiplier k.

In the present system and method, a buffer is used to store the points that will be added later until the buffer is full or the last bit of the multiplier k is inspected. Then, the stored points in the buffer are added to the accumulation point. The same procedure is repeated whenever the buffer is full again. This makes the power trace appears as a repeated sequence of consecutive point doubling followed by consecutive point additions. This makes it very difficult for an attacker to know the exact value of the inspected bit during the scalar multiplication process. The pseudo-code of the method for securing scalar multiplication against simple power attacks is given below in Algorithm 3:

---
Algorithm 3: Double-and-Delayed-Add
---

```
Inputs: P,k
Output: kP
Initialization:
    Q[0] = 0; Q[1] = P
Scalar Multiplication:
    for i = 0 to m-1
        if k_i = 1 then
            save Q[1] in the buffer
            if the buffer is full or i = m-1 then
                while the buffer is not empty do
                    Q[0] = ADD(Q[0], a point from the buffer)
                    update the buffer by removing the point that
                    has been added in the previous step
                end while
            end if
        end if
        Q[1] = DBL(Q[1])
    end for
    return Q[0]
```

The method is of general application, and may be used wherever it is necessary to perform scalar multiplication, including public-key exchange, digital signatures, message encryption and decryption, etc.

It should be understood that the calculations may be performed by any suitable computer system, such as that diagrammatically shown in the sole FIGURE. Data is entered into the system 100 via any suitable type of user interface 116, and may be stored in memory 112, which may be any suitable type of computer readable and programmable memory, preferably in the form of non-transitory storage media. Calculations are performed by a processor 114, which may be any suitable type of computer processor and may be displayed to the user on display 118, which may be any suitable type of computer display.

The processor 114 may be associated with, or incorporated into, any suitable type of computing device, for example, a personal computer or a programmable logic controller. The display 118, the processor 114, the memory 112 and any associated non-transitory computer readable recording media are in communication with one another by any suitable type of data bus, as is well known in the art.

Examples of computer-readable recording media, as used herein, include a magnetic recording apparatus, an optical disk, a magneto-optical disk, and/or a semiconductor memory (for example, RAM, ROM, etc.), or any other form of non-transitory computer readable media. Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The method is of general application, and may be used wherever it is necessary to perform scalar multiplication, including public-key exchange, digital signatures, message encryption and decryption, etc. The present method requires m point doublings and an average of m/2 point additions. This performance improves to m point doublings and an average of m/3 point additions when non-adjacent form (NAP) encoding is used. The method requires no extra dummy computations to secure scalar multiplication against SPA attacks.

The security of the present method depends on the confusion level that could be reached by using the buffer. If the buffer size is very large, the method will perform all of the doublings and then all of the additions, which makes it impossible for the attacker to infer the key. A moderate buffer size should be on the order of $\log_2(m)$ to reach a confusion level that secures scalar multiplication against SPA attacks.

It is to be understood that the present invention is not limited to the embodiments described above, but encompasses any and all embodiments within the scope of the following claims.

I claim:

1. A method for securing elliptic curve scalar multiplication of a private key k with a point P against simple power attacks using a cryptographic device, comprising the steps of:
    establishing buffer memory;
    precomputing a plurality of points Q[i] on an elliptic curve, wherein i is an integer;
    partitioning the private key k into m bits, wherein m is an integer, such that $k=(k_{m-1}, \ldots, k_0)$;
    for each of the partitions, for i=0 to m-1, and if $k_i=1$, performing scalar multiplication as:
        saving Q[1] in the buffer memory;
        if the buffer memory is full or i=m-1, then, while the buffer memory is not empty, updating Q[0] by adding Q[0] with a point from the buffer memory; and
        updating the buffer memory by removing the added point from step (e);
    updating Q[1] by point doubling of Q[1];
    setting a scalar product kP equal to Q[0]; and
    displaying the scalar product kP.

2. A computer software product that includes a non-transitory storage medium readable by a processor, the non-transitory storage medium having stored thereon a set of instructions for securing elliptic curve scalar multiplication of a private key k with a point P against simple power attacks using a cryptographic device, the instructions comprising:
    (a) a first set of instructions which, when loaded into main memory and executed by the processor, causes the processor to establish buffer memory;
    (b) a second set of instructions which, when loaded into main memory and executed by the processor, causes the processor to precompute a plurality of points Q[i] on an elliptic curve, wherein i is an integer;
    (c) a third set of instructions which, when loaded into main memory and executed by the processor, causes the processor to partition the private key k into m bits, wherein m is an integer, such that $k=(k_{m-1}, \ldots, k_0)$;
    (d) a fourth set of instructions which, when loaded into main memory and executed by the processor, causes the processor to save Q[1] in the buffer memory for each of the partitions and if $k_i=1$;
    (e) a fifth set of instructions which, when loaded into main memory and executed by the processor, causes the processor to update Q[0] by adding Q[0] with a point from the buffer memory for each of the partitions while the buffer memory is not empty and if $k_i=1$ and if the buffer memory is full or i=m-1;
    (f) a sixth set of instructions which, when loaded into main memory and executed by the processor, causes the processor to update the buffer memory by removing the added point from the fifth set of instructions for each of the partitions and if $k_i=1$;

(g) a seventh set of instructions which, when loaded into main memory and executed by the processor, causes the processor to update Q[1] by point doubling of Q[1];

(h) an eighth set of instructions which, when loaded into main memory and executed by the processor, causes the processor to set a scalar product kP equal to Q[0]; and (i) a ninth set of instructions which, when loaded into main memory and executed by the processor, causes the processor to display the scalar product kP.

\* \* \* \* \*